Sept. 21, 1937. M. R. DADSWELL 2,093,804
SWINGING BED OR BUNK
Filed Dec. 14, 1934

INVENTOR.
MERCY R. DADSWELL
BY Ralph L. Dunn
ATTORNEY.

Patented Sept. 21, 1937

2,093,804

UNITED STATES PATENT OFFICE 2,093,804

SWINGING BED OR BUNK

Mercy R. Dadswell, Detroit, Mich.

Application December 14, 1934, Serial No. 757,508

2 Claims. (Cl. 114—192)

This invention relates to a support for a bed or bunk for use on a ship or vehicle.

The primary object of this invention is to provide a structure that may freely swing so as to overcome the shocks, pitching or other jars encountered in a ship or traveling vehicle and which at the same time conserves the space of the cabin or compartment and which may also provide a back for a settee or divan.

Another object of this invention is the provision of a structure that will accomplish the aforesaid primary object and which may be used with very little outlay of capital for new equipment.

Heretofore there have been many devices provided with self-leveling mechanism for use in maritime vessels and on vehicles but they do not combine all the features of my invention.

In accomplishing my objects, I provide a pair of supports or hangers which may be supported across the cabin or compartment in any suitable manner but I prefer to support them from the ceiling and from the side wall of the cabin or compartment.

Upon each of these hangers I provide a slidable carriage equipped with clamping means for holding it in any desired position thereon. I provide each carriage with a depending bracket member and I secure flexible supports to each depending bracket member in a manner such as to provide for substantially universal movement of the flexible supports. The flexible supports in turn connect in any suitable manner to a frame structure which is adapted to carry the bed or bunk.

By this structure one may move the carriage out to a substantial distance from the wall so as to permit the bunk to swing freely without contacting the wall and by properly locating the device with reference to the length of the cabin or compartment in which it is to be mounted, the bunk may freely swing longitudinally in the cabin without contacting the front or rear walls thereof. Thus as the ship or vehicle sways or pitches or lurches, the bunk may freely swing and suspend itself in a substantially horizontal plane and, when not in use, the carriages may be moved on the hangers to a position adjacent a side wall, clamped in that position and the frame member for supporting the bunk may be raised into a perpendicular position, where it may be held by any suitable means, and, by providing suitable cushions, it may be used as the back of a divan or settee.

The invention itself and the manner in which I accomplish my objects as well as its advantages will more fully appear from the following description thereof taken in conjunction with the accompanying drawing, in which.

Figure 1:
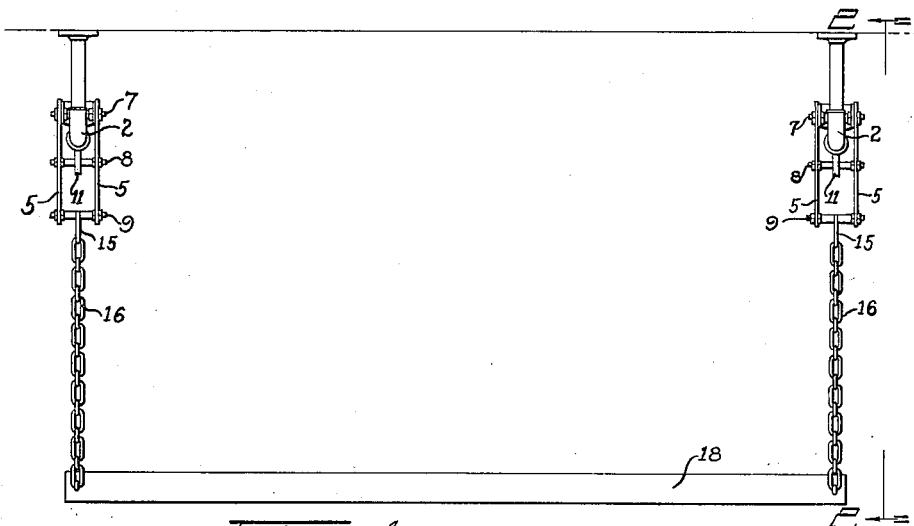
Fig. 1 is a side elevational view of the device.
Figure 2:
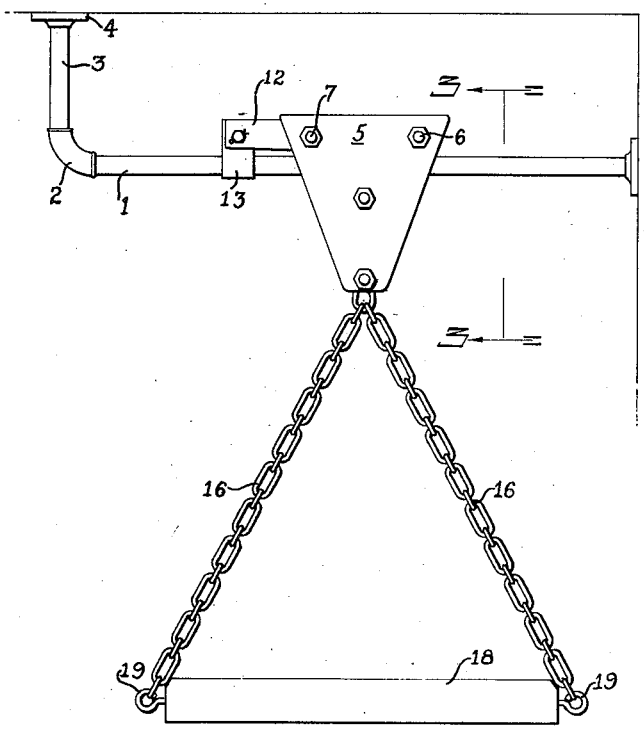
Fig. 2 is an end view of the device taken on the line 2—2 of Fig. 1.

Referring to the drawing, in which like reference characters designate like parts throughout, I provide a pair of supports or hangers, each comprising, as illustrated, a suitable bar 1, provided with an elbow 2, and up-right support 3 and suitable bracket members 4, one bracket member being on the upper end of the up-right member 3 and the other being on the end of the bar 1 adjacent the wall, the said bracket members being adapted to be secured respectively to the ceiling and side wall of the cabin or vehicle body, in any suitable manner.

Each carriage comprises a pair of spaced plates 5, held apart by a plurality of spacers mounted on a plurality of shafts. Preferably there are five of these shafts to each carriage. In each carriage, two shafts, 6 and 7, accommodate a pair of rollers 10 that ride above the bar and one shaft 8 accommodates a roller 11 that rides below the bar. The fifth shaft 9 of each carriage carries a link 15 which accommodates the flexible supporting members, which in this illustration, comprise chains 16.

In order to secure the carriages in desired position, I provide them with linking devices comprising a connecting bar 12 suitably secured to one plate 5, and a clamping member 13 is detachably secured thereto in any suitable manner, so that the clamps may be released and the carriages moved on the bars 1 to any desired position and again clamped.

Figure 3:
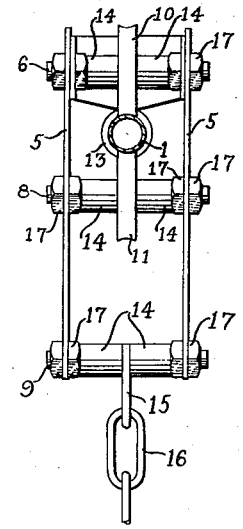
Fig. 3 is an enlarged detail view of one of the carriages taken on line 3—3 of Fig. 2.

The rollers 10 and 11 as well as the link 15 and the plates 5 are properly spaced apart by suitable spacing members 14 mounted on each of the shafts 6, 7, 8 and 9, as more clearly shown in Fig. 3 and lock nuts 17 are mounted on the respective shafts as shown.

The flexible members, or chains 16, are suitably secured to a frame member 18 adjacent its four corners as by staples 19.

Having thus fully described my invention, I do not desire to be limited to the exact structure shown but desire to include any and all structures coming within the scope of the appended claims.

I claim:—

1. A support for a bed or bunk in ships or moving vehicles including a pair of spaced supporting arms and slidable means for readily moving said bed or bunk comprising a pair of travelling shives mounted to slide on said supporting arms, one shive on each arm, means for stopping the movement of said shives at any intermediate point of travel on said arms, flexible supporting means adapted for connection to the bed or bunk and a universal joint connecting said flexible supporting means to the respective shives.

2. A support for a bed or bunk in ships or moving vehicles including a pair of spaced elevated members, a slidable carriage mounted and adapted to slide upon each of said elevated members, said carriages having depending bracket members, means for locking said slidable carriages in any desired position upon said elevated members and flexible supporting means suspended from the depending brackets of said slidable carriages adapted to carry a bed or bunk, said flexible means being pivotally connected to the depending brackets of said slidable carriages to freely permit lateral and longitudinal swinging thereof.

MERCY R. DADSWELL.